United States Patent [19]

Nothnagel

[11] Patent Number: 5,380,771

[45] Date of Patent: * Jan. 10, 1995

[54] AQUEOUS DISPERSION OF AMINE SALTS OF AN ACRYLIC POLYMER

[75] Inventor: Joseph L. Nothnagel, Maple Grove, Minn.

[73] Assignee: Cargill Incorporated, Minneapolis, Minn.

[*] Notice: The portion of the term of this patent subsequent to Jun. 7, 2011 has been disclaimed.

[21] Appl. No.: 901,796

[22] Filed: Jun. 22, 1992

Related U.S. Application Data

[63] Continuation-in-part of Ser. No. 731,489, Jul. 17, 1991, abandoned.

[51] Int. Cl.$^6$ .............. C08J 3/05; C08J 3/03; C08L 33/02; C08L 33/10
[52] U.S. Cl. .................. 523/339; 523/336; 523/337; 524/556; 524/801; 525/329.9
[58] Field of Search ............ 523/336, 337, 339; 524/556, 801; 525/329.9

[56] References Cited

U.S. PATENT DOCUMENTS

| | | | |
|---|---|---|---|
| Re. 28,474 | 7/1974 | Anderson et al. | 260/29.6 |
| Re. 28,576 | 10/1975 | Anderson et al. | 260/29.6 |
| Re. 31,936 | 7/1985 | Sperry et al. | 524/522 |
| 2,313,144 | 3/1943 | Gomm | 260/32 |
| 2,460,582 | 2/1949 | Japs | 260/29.6 |
| 2,606,164 | 8/1952 | Henson et al. | 260/23 |
| 3,296,172 | 1/1967 | Funck et al. | 260/29.6 |
| 3,301,810 | 1/1967 | Hunter et al. | 260/29.7 |
| 3,562,196 | 2/1971 | Bissot | 260/23 |
| 3,642,676 | 2/1972 | Saunders et al. | 260/23 |
| 3,852,234 | 12/1974 | Venema | 260/29.6 |
| 3,879,327 | 4/1975 | Burke, Jr. | 260/29.6 |
| 3,941,727 | 3/1976 | Timmerman et al. | 260/8 |
| 3,980,602 | 9/1976 | Jakubauskas | 260/29.6 |
| 3,994,848 | 11/1976 | Dunlop et al. | 260/29.2 |
| 4,021,399 | 5/1977 | Hunter et al. | 260/29.6 |
| 4,022,731 | 5/1977 | Schmitt | 260/29.6 |
| 4,022,736 | 5/1977 | Schmitt | 260/29.6 |
| 4,022,741 | 5/1977 | Tuka et al. | 260/29.4 |
| 4,042,645 | 8/1977 | Hirota et al. | 260/830 |
| 4,051,065 | 9/1977 | Venema | 252/359 |
| 4,062,817 | 12/1977 | Westerman | 260/17.45 |
| 4,064,092 | 12/1977 | Burroway et al. | 260/29.6 |
| 4,073,763 | 2/1978 | Tai | 260/29.4 |
| 4,146,499 | 3/1979 | Rosano | 252/186 |
| 4,255,308 | 3/1981 | Brasen | 260/29.6 |
| 4,261,946 | 4/1981 | Goyert et al. | 264/211 |
| 4,314,922 | 2/1982 | Lehner et al. | 260/29.2 |
| 4,316,929 | 2/1982 | McIntire et al. | 428/262 |
| 4,328,282 | 5/1982 | Lehner et al. | 428/425.9 |
| 4,334,034 | 6/1982 | Lehner et al. | 525/28 |
| 4,357,221 | 11/1982 | Lehner et al. | 204/181 |
| 4,363,886 | 12/1982 | Lipowski et al. | 523/336 |
| 4,366,293 | 12/1982 | Tobias | 525/301 |
| 4,435,528 | 3/1984 | Domina | 523/332 |
| 4,458,040 | 7/1984 | Suzuki et al. | 523/412 |
| 4,503,172 | 3/1985 | Farrar et al. | 523/336 |

(List continued on next page.)

FOREIGN PATENT DOCUMENTS

| | | |
|---|---|---|
| 118009 | 9/1984 | European Pat. Off. |
| 183119 | 6/1988 | European Pat. Off. |
| 288763 | 11/1988 | European Pat. Off. |
| 305850 | 3/1989 | European Pat. Off. |
| 346886 | 12/1989 | European Pat. Off. |
| 350040 | 1/1990 | European Pat. Off. |
| 2011057 | 9/1970 | Germany . |
| 1123285 | 8/1968 | United Kingdom . |
| 1291392 | 10/1972 | United Kingdom . |
| 2207140 | 1/1989 | United Kingdom . |

OTHER PUBLICATIONS

Mcewan, *Aqueous Dispersion Enamael A New Automotive Topcoat Technology*, 2 J. of Water Borne Coatings 3 (1979).

Brendley et al. *Chemistry and Technology of Acrylic Resins for Coatings*, ACS Symposium Series 285 (1985).

*Primary Examiner*—Paul R. Michl
*Assistant Examiner*—Andrew E. C. Merriam
*Attorney, Agent, or Firm*—Fitch, Even, Tabin & Flannery

[57] ABSTRACT

Acrylic polymer aqueous dispersions and a method of making such dispersions are described.

7 Claims, No Drawings

U.S. PATENT DOCUMENTS

| | | | |
|---|---|---|---|
| 4,524,175 | 6/1985 | Stanley, Jr. | 524/831 |
| 4,554,298 | 11/1985 | Farrar et al. | 523/336 |
| 4,579,888 | 4/1986 | Kodama et al. | 523/412 |
| 4,591,609 | 5/1986 | Kubo et al. | 523/337 |
| 4,650,827 | 3/1987 | Becker et al. | 524/801 |
| 4,665,107 | 5/1987 | Micale | 523/105 |
| 4,714,728 | 12/1987 | Graham et al. | 525/329.9 |
| 4,730,021 | 3/1988 | Zom et al. | 524/457 |
| 4,758,625 | 7/1988 | Boyack et al. | 525/123 |
| 4,798,861 | 1/1989 | Johnson et al. | 524/458 |
| 4,888,383 | 12/1989 | Huybrechts | 524/832 |
| 5,051,464 | 9/1991 | Johnson et al. | 525/131 |
| 5,068,266 | 11/1991 | Kojima et al. | 523/322 |
| 5,102,946 | 4/1992 | Chen et al. | 524/527 |

AQUEOUS DISPERSION OF AMINE SALTS OF AN ACRYLIC POLYMER

This is a continuation-in-part application of Ser. No. 731,489 filed on Jul. 17, 1991, now abandoned. This application relates to aqueous dispersions and aqueous polymeric vehicles of high molecular weight acrylic polymers and a method for making such dispersions and polymeric vehicles. More particularly, this Application relates to the formation of aqueous dispersions of water dispersible amine salts of high molecular weight acrylic polymers from an azeotrope of a substantially water immiscible organic solvent and water, the azeotrope having a boiling point of not more than about 95° C.

BACKGROUND

For about the last fifty years, protective and decorative coatings based upon acrylic polymers have been increasingly used. These polymers have been utilized in many applications because they have provided a wide range of strength, flexibility, toughness, adhesion, degradation resistance and other film properties. Many acrylics, however, are solution polymers because they are prepared and applied as solutions of organic polymers in organic solvents. In coatings technology, polymeric vehicles which included thermoplastic acrylic polymers required the use of organic solvents which often are toxic and/or subject to regulation that demand their reduction in coating compositions.

Environmental concern has become increasingly important. This concern not only extends to preservation of the environment for its own sake, but extends to safety for the public as to both living and working conditions. Volatile organic emissions resulting from coating compositions which are applied and used by industry and by the consuming public are often not only unpleasant, but contribute to photochemical smog. Governments have established regulations setting forth guidelines relating to volatile organic compounds (VOCs) which may be released to the atmosphere. The U.S. Environmental Protection Agency (EPA) has established guidelines relating to the amount of VOCs released to the atmosphere, such guidelines being scheduled for adoption by the states of the United States. Guidelines relating to VOCs, such as those of the EPA, and environmental concerns are particularly pertinent to the paint and industrial coating industry which uses organic solvents which are emitted into the atmosphere.

The use of water based polymeric vehicles, or alternatively, high solids polymeric vehicles are two general approaches that have been used to reduce VOCs. Aqueous systems have limited the molecular weights of the polymers used in the polymeric vehicle, which limited the hardness and other properties of the coating binders and films which resulted from the polymeric vehicles. Moreover, high levels of coalescents often have been required in aqueous thermoplastic vehicles. In water reducible cross-linkable systems, as opposed to aqueous thermoplastic emulsions, molecular weights of polymers have been kept low and have required cross-linking.

The high solids approach often includes organic solvents or powder coatings. High solids, however, present problems in disposition of the polymeric vehicle. In powder systems requiring heat, disposition efficiency often is less and use of more than one color is difficult. Other high solids systems also may require specialized equipment because of the high solids content and the use of at least some organic solvents which are VOCs.

It is an object of this invention to provide water dispersions of high molecular weight acrylic polymers which dispersions have low VOCs.

It also is an object of this invention to provide a process for making aqueous dispersions of amine salts of high molecular weight acrylic polymers.

It is a further object of this invention to provide a low VOC thermoplastic or cross-linkable polymeric vehicle which includes a high molecular weight acrylic polymer.

Still further objects and advantages of the invention will be found by reference to the following description.

SUMMARY OF THE INVENTION

This invention provides a stable water dispersion of an amine salt of a high molecular weight acrylic polymer. The dispersion is the result of mixing a dispersion of substantially water immiscible organic solvent and a water dispersible amine salt of the high molecular weight acrylic polymer with water, inverting the mixture and removing the organic solvent by heating or distilling the inverted mixture of the water dispersible acrylic amine salt, an azeotrope being formed from the water and the substantially water immiscible organic solvent. The acrylic polymer has a molecular weight of at least about 12,000, has free carboxyl groups available for neutralization and has an acid value in the range of from about 15 to about 100 and preferably not above 75. Further, the water dispersion is substantially free of surfactants and emulsifying agents as such agents are not required to maintain the dispersion. The invention permits manufacture of the aqueous dispersion from the polymer using one reaction vessel. The azeotrope has a boiling point of not more than 95° C. and preferably between about 85° C. to about 95° C. The substantially water immiscible organic solvent should have a boiling point of at least above about 100° C. and the amount of water in the amine salt/organic solvent/water mixture during the heating or distilling of the azeotrope should be maintained in an amount effective to provide a solids level in the final aqueous dispersion that is desired. The water dispersion of the invention does not have more than about 2 weight percent organic solvent after distillation or heating of the azeotrope which reduces or removes the organic solvent.

The water dispersion of the invention includes the water dispersible amine salt of the high molecular weight acrylic polymer as well as the unsalified polymer, but the aqueous dispersion of the invention does not have less than 60 percent of the free carboxyl groups of the acrylic polymer neutralized or converted into an amine salt. As the acid number of the polymer goes down, the higher the percent of the carboxyl groups on the acrylic polymer must be neutralized. To maintain the dispersion below an acid value of about 40, about 100% of the carboxyl groups on the polymer should be neutralized to the amine salt. In an important aspect of the invention, about 100% of the carboxyl groups on the acrylic polymer are neutralized to the amine salt.

The acrylic polymer amine salt preferably is formed in situ in the organic solvent with water being added to the amine salt/organic solvent combination. In an alternate embodiment of the invention, however, the acrylic polymer is dispersed in the organic solvent and water, which includes an amine in an amount effective for neutralizing the polymer, is added to the organic solvent/polymer dispersion to neutralize the acrylic polymer to an amine salt. The organic solvent to water ratio is at least greater than about 1:1 and preferably is at least 2:1 when the water/acrylic polymer/organic solvent dispersion are mixed together. An organic solvent to water ratio less than 1:1 would tend to waste organic solvent.

After mixing the water/acrylic polymer or acrylic polymer amine salt/organic solvent mixture, that mixture is inverted and the organic solvent is removed by heating or distilling the inverted mixture of water/organic solvent/acrylic polymer amine salt as an azeotrope comprising the water and organic solvent. Water which is distilled from the water and acrylic polymer amine salt and water substantially immiscible organic solvent dispersion is circulated back to that dispersion to increase the water content thereof relative to the organic solvent.

The water dispersion of the invention includes a high molecular weight acrylic polymer and the water dispersible amine salt of the high molecular weight acrylic polymer, but does not require organic co-solvents for use with the water media of the aqueous dispersion to maintain the aqueous dispersion. The dispersions of the invention do not have more than about one pound per gallon of aqueous dispersion (119.46 g/l) VOCs. The water dispersion of the invention is stable through at least 5 freeze-thaw cycles, about −5° C. for the freeze cycle and about 25° C. for the thaw cycle wherein the freeze and thaw cycle are each 24 hours.

An important aspect of the invention is a polymeric vehicle which provides a coating binder of a coating composition. The polymeric vehicle which includes the water dispersion of the invention provides a formulated coating composition having a VOC of less than one pound per gallon of formulated coating composition, eliminates a need for surfactants and coalescents and includes water dispersible amine salts of acrylic polymers. In an important aspect of the invention the acrylic polymers have molecular weights in the range of from about 30,000 to about 300,000. Water dispersions of such high molecular weight acrylic polymers provide an acrylic coating binder with improved film characteristics which include, but are not limited to improved lay down performance of the wet film, enhanced film build of the film per pass, faster dry fiber times, improved corrosion resistant films, harder films, more abrasion resistant films, and improved humidity resistant films. The polymeric vehicle of the invention also provides coating binders for improved exterior "ultraviolet resistant" durable films which are derived from an aqueous low VOC formulated coating composition. Films provided from the invention are improved over that of aqueous thermoplastic emulsions or water reducible systems of low molecular weight thermoplastic or those thermosetting polymers requiring cross-linking.

Another important aspect of the invention is the process for providing the aqueous dispersion and polymeric vehicle of the invention. In the process for making the water dispersion of the water dispersible amine salt of the acrylic polymer, the amine salt of the acrylic polymer is the reaction product of a mixture comprising the acrylic polymer having free carboxyl groups, an amine and a substantially water immiscible organic solvent as described above in a neutralization reaction. The process comprises adding water to a dispersion of the acrylic polymer or the amine salt of the acrylic polymer in the media of the substantially water immiscible organic solvent to form an acrylic polymer amine salt/organic solvent/water mixture. The mixture is a water in organic solvent dispersion which is inverted and forms organic solvent in water dispersion. The dispersion forms the azeotrope. The azeotrope is heated to remove the water immiscible organic solvent. Upon heating both water and organic solvent are removed as the azeotrope and condensed. After the water and substantially water immiscible solvent from the water dispersion are condensed, they separate. This permits circulation of the water separated from the organic solvent back into the mixture to provide an aqueous dispersion of the amine salt of the acrylic polymer having less than 2 weight percent of organic solvent. The water and water immiscible organic solvent should be in amounts effective for forming an azeotrope with a boiling point of not more than about 95° C. and preferably between about 85° C. and about 95° C., in ratios as previously described.

The water soluble amine salt of the acrylic polymer is dispersed in the organic solvent preferably is formed in situ in the organic solvent. Thereafter, the water to form the azeotrope is mixed with the acrylic amine salt and organic solvent combination. At some point during the addition of the water to the acrylic amine salt and organic solvent an inversion takes place wherein the particulate water droplets are no longer coated with solvated acrylic polymer, but droplets of acrylic polymer amine salt are surrounded by water, excluding the solvent as the solvating media. Thereafter the organic solvent is removed as an azeotrope between the organic solvent and water by heating to a temperature of not more than about 95° C. The process permits the removal of the organic solvent with a resulting water dispersion of an amine salt of a high molecular weight acrylic polymer.

In another important aspect of the invention, the acrylic polymer is a reaction product of a precursor acrylic polymer and a diisocyanate.

DESCRIPTION OF THE PREFERRED EMBODIMENTS

As used in this application, "polymer" means a polymer with repeating monomeric units. "Polymeric vehicle" means all polymeric and resinous components in the formulated coating, i.e., before film formation, including but not limited to the water dispersible salt of an acrylic polymer. The polymeric vehicle may include a cross-linking agent. "Coating binder" means the polymeric part of the film of the coating after solvent has evaporated, and with a thermosetting polymeric vehicle after cross-linking. "Formulated coating" means the polymeric vehicle and solvents, pigments, catalysts and additives which may optionally be added to impart desirable application characteristics to the formulated coating and desirable properties such as opacity and color to the film. "VOC" means volatile organic compounds and "low VOC" in connection with a dispersion or formulated coating composition means about 1 pound per gallon or about 119.46 grams of volatile organic compounds per liter of dispersion or formulated coating composition. "Volatile organic compounds" are defined by the U.S. Environmental Protection Agency as any organic compound which participates in atmospheric photochemical reactions, except for specific designated compounds which have negligible photochemical activity. Water is not a VOC. The following compounds generally have been designated as VOCs. VOCs include but are not limited to myrcene, cumene, butyne, formaldehyde, carbon tetrachloride, aniline, dimethylnitrosamine, formic acid, acetone, chloroform, hexachloroethane, benzene, trichloroethane, methane, bromomethane, ethane, ethene, acetylene, chloromethane, iodomethane, dibromomethane, propane, 1-propyne, chloroethane, vinyl chloride, acetonitrile, acetaldehyde, methylene chloride, carbon disulfide, thiobismethane, bromoform, bromodichloromethane, 2-methylpropane, 1,1-dichloroethane, 1,1-dichloroethene, phosgene, chlorodifluoromethane, trichlorofluoromethane, dichlorodifluoromethane, tetrafluoromethane, tetramethylplumbane, 2,2-dimethylbutane, monomethylestersulphuric acid, dimethyl-butanone, pentachloroethane, trichloro-trifluroethane, dichlorotetrafluoroethane, hexachlorocyclopentadiene, dimethyl sulfate, tetraethylplumbane, 1,2-dibromopropane, 2-methylbutane, 2-methyl-1,3-butadiene, 1,2-dichloropropane, methyl ethyl ketone, 1,1,2-trichloro ethane, trichloroethene, 2,3-dimethylbutane, tetrachloroethane, dimethyl-3-methylenebicyclo-heptane, A-pinene, hexachloro-butadiene, methylnaphthalene, naphthalene, quinoline, methylnaphthalene, phenylpropanone, dimethylbenzene, O-cresol, chloro-methylbenzene, dichlorobenzene, trimethylbenzene, tetramethylbenzene, dibromo-3-chloropropane, 3-methylpentane, 3-pentanone, methylcyclopentane, (1-methylethyl)-benzene, 1-(methylethenyl)-benzene, 1-phenylethanone, nitrobenzene, methyl-methylethyl-benzene, ethylbenzene, ethenylbenzene, benzylchloride, benzonitrile, benzaldehyde, propylbenzene, butylbenzene, 1,4-diethylbenzene, 2,4-dimethylphenol, dimethylbenzene, chloro-methylbenzene, dichlorobenzene, dibromoethane, 3-bromo-1-propene, butane, 1-butene, 1,3-butadiene, 2-propenal, bromochloroethane, 1,2-dichloroethane, propanenitrile, 2-propenenitrile, 2-methylpentane, 2-pentanone, 2,4-dimethylpentane, 1,3-dimethylbenzene, m-cresol, 2,4-dimethylpyridine, 2,6-dimethylpyridine, trimethylbenzene, dimethylphenol, trichlorobenzene, trimethyl-pyridine, bromobenzene, methylcyclohexane, toluene, chlorobenzene, phenol, 2-methylpyridine, pentene, 1-pentane, bromo-chloro-propane, 1H-pyrrole, tetrahydrofuran, hexane, 1,4dichlorobutane cyclohexane, cyclohexene, pyridine, octane, 1-octene, nonane, dodecane, propene, 2-methyl-1-pentene, 2-methyl-1-propene, isoquinoline, trichlorobenzene, propanal, butanal, 1,4-(dioxane), 1-nonene, decane, dibromochloromethane, 2-chloro-butadiene, tetrachloroethene, dimethyl-methylene-bicyclo-heptane, 1,2-diethylbenzene, (1-methylpropyl)-benzene, Acetic Acid ethyl-ester, 1,3-diethylbenzene, cyclopentene, heptane, cis-dichloroethene, trans-dichloroethene, cyclopentane, cycloheptane, 1,2-propadiene, carbon oxide sulfide, 2,2,3-trimethylbutane, tetramethylbenzene, 2,4,5-trimethylphenol, 2-methyl-2-butene, tetramethylbenzene, 2,4,6-trimethylphenol, pentylbenzene, trimethyl-pentane, decamethylcyclo-pentasil-oxane, 1,3-dichlorobenzene, hexadecane, 2-methylthiophene, 3,3-dimethylpentane, 3-methyl-1-butene, 2-methyl-1-butene, 2,2,3-trimethylpentane, 2,3-dimethylpentane, 2,3,4-trimethylpentane, 2,6-dimethylphenol, 1,2,3-trimethylbenzene, 2,3-dimethylpyridine, 2,3-dimethylhexane, 3-chlorobenzaldehyde, 3-methylhexane, 2,4-dimethylhexane, 3-methylheptane, (Z)-2-butene, 2-methylhexane, trimethylbicyclo-heptane, (E)-2-heptene, 4-methylnonane, tetrachlorobenzene, butene, chloronitrobenzene, dichlorobenzene, dichloroethene, tetramethyl benzene, bromopropane, dichloro-1-propene, chlorobenzeneamine, dimethylcyclohexane, dichloronitrobenzene, dichloronaphthalene, dimethylcyclopentane, bromomethylbenzene, dichloromethyl-benzene, benzenedicarboxal-dehyde, benzoyl nitro peroxide, bromochloropropane, dibromo-chloro-propane, pentachlorobutadiene, dibromochloropropane, 2-butoxyethanol, bromopentachloro ethane, tetradecamethylcycloheptasiloxane, trimethyl-pentanediol, dodecamethylcyclo-hexasil-oxane, hexamethylcyclotrisiloxane, octamethylcyclo-tetrasil-oxane, hexadecamethylcyclo-octasil-oxane, tridecane, tetradecane. "Film" is formed by application of the formulated coating to a base or substrate, evaporation of solvent, if present, and cross-linking if a cross-linking resin is present and/or required. "Thermoplastic polymeric vehicle" is a polymeric vehicle which does not require cross-linking to provide a film for a coating binder. "Thermosetting polymeric vehicle" is a polymeric vehicle which requires heat and cross-linking to provide a film for a coating binder.

"Azeotrope" is a mixture of two or more liquids and that mixture behaves as if it were only one liquid, that is, having a distinct boiling point and a defined and constant composition of the two or more liquids which make up the "azeotrope". Although most azeotropes are solutions, cases are encountered in which the azeotrope separates into phases. Such a mixture is a "constant boiling mixture" and for the purposes of this Application such a mixture is an azeotrope. In reference to organic solvents, "substantially water immiscible" means that less than 100 g/L of organic solvent is soluble in water at 25° C.

"Acrylic polymer" means a polymer or copolymers of

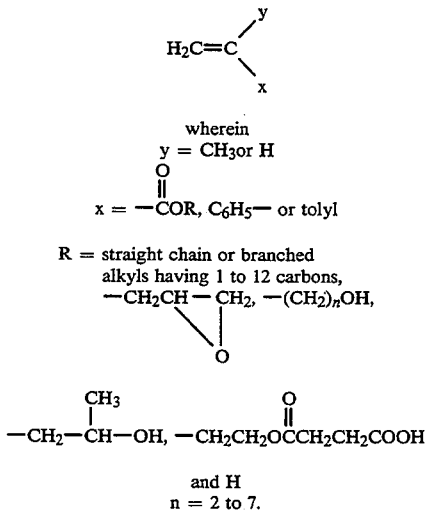

In the case of hydroxy-substituted alkyl acrylates the monomers may include members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxy-propyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

"Air dried formulated coating composition" means a formulated coating composition that produces a satisfactory film without heating or baking, but which provides a satisfactory film at ambient temperature such as at about 25° C.

"Baked formulated coating composition" means a formulated coating composition that provides optimum film properties upon heating or baking above ambient temperature.

"Water dispersion of an amine salt of an acrylic polymer" means a dispersed amine salt of an acrylic polymer in a water media.

"Substantially free of emulsifiers" means a composition with not more than about 0.5 weight percent emulsifiers.

An acrylic polymer is substantially completely neutralized if about 100% of its free carboxyl groups are salified.

"Chlorinated polyolefin" means a hydrocarbon which has been grafted with Cl using chlorine and contains from about 15 to about 35 weight percent Cl and where after such grafting the polyolefin will have a molecular weight of at least about 10,000 and preferably in the range of from about 20,000 to about 100,000. Generally these compounds are made by reacting chlorine with a saturated hydrocarbon in a free radical reaction where the Cl replaces a hydrogen in the polymer.

According to the invention, a stable water dispersion of a water dispersible amine salt of an acrylic polymer is formed by heating a water dispersible amine salt of an acrylic polymer, a substantially water immiscible organic solvent and water and driving off the organic solvent by distillation of the azeotrope formed by the organic solvent and water. The acrylic polymer has free hydroxyl groups which may be neutralized, an acid value in the range of from about 15 to about 100 and a molecular weight of at least about 12,000.

The organic solvent is substantially immiscible with water, must azeotrope with water with such azeotrope having a boiling temperature of not more than about 95° C. An azeotrope with a boiling point greater than 95° C. makes it difficult to separate the azeotrope from that portion of the water which forms the dispersion with the acrylic amine salt. Because of this poor separation of azeotrope from the water of the dispersion, excess distillation of the water of the dispersion would result causing increased particle size of the acrylic salt of the dispersion and possible total collapse of the dispersion. Preferably, the boiling point of the azeotrope should be in the range of from about 85° C. to about 95° C. Further, the boiling point of the organic solvent should be at least above about 100° C., but a higher boiling point effective for permitting an extension reaction is required when the acrylic polymer with an active hydrogen is chain extended with a diisocyanate as hereinafter described.

Typical organic solvents which may be used in the invention include but are not limited to: aliphatic hydrocarbons such as hexane, VM & P naphtha which is an aliphatic hydrocarbon solvent and Mineral Spirits which has a boiling point of about 165° C.; aromatic hydrocarbons such as toluene, xylene, Aromatic 100*, Aromatic 150*; ketones such as acetone, methyl ethyl ketone, methyl isobutyl ketone, methyl amyl ketone, cyclohexanone, isophorone; and esters such as ethyl acetate, n-butyl acetate, amyl acetate, ethylene glycol \* Aromatic 100 and 150 are trade names of Exxon Chemical Company. Aromatic 100 and Aromatic 150 are aromatic solvents having boiling points of about 185° C. and about 195° C. to about 200° C., respectively. monoethyl ether acetate, ethylene glycol monobutyl ether acetate, propylene glycol monomethyl ether acetate with the following solvents being preferred: xylene, methyl-n-amyl ketone, ethoxy ethyl propionate, Mineral Spirits, Aromatic 100, Aromatic 150, Exxate 600\*\* (boiling point of about 165° C. to about 175° C.), Exxate 700 (boiling point of about 180° C. to about 185° C.). During or after the inversion described herein, the azeotrope is heated or distilled to drive off the organic solvent for a time and temperature sufficient to leave less than 1 pound/gallon VOC dispersion or at least less than about 2 weight percent organic solvent.

The invention permits aqueous dispersions of acrylic polymers having high molecular weights. These molecular weights may range from about 12,000 to about 300,000. Moreover, from about 5 to about 20 weight percent chlorinated polyolefin may be incorporated into the acrylic polymer by reacting the chlorinated polyolefin with the acrylic polymer or monomers thereof to make the acrylic polymer. The incorporation of chlorinated polyolefin improves the adhesion properties of the polymeric vehicle of the invention, especially to thermoplastic polyolefin substrates such as those commercially available under the names Dexter 813 or Dexter 815 type TPO. These thermoplastic polyolefins are particularly used in the automobile industry such as in making exterior body parts or interior molding where adhesion properties for polymeric vehicles for paint coatings are particularly important.

To permit water dispersibility and neutralization to a salt, the acrylic polymer should have an acid value in the range as aforesaid. In an important aspect of the invention the amine salt of the acrylic \*\* Exxate is a trade name of Exxon Chemical Company and Exxate 600 and Exxate 700 are alkyl propionate solvents. polymer is made by dispersing the acrylic polymer with carboxylic acid functionality into the organic solvent which is substantially immiscible with water. Thereafter the acrylic polymer is neutralized. After that neutralization water having a pH above about 7 is added to the acrylic polymer amine salt/organic solvent dispersion. The pH of the water is raised to above 7 to assure complete formation and maintenance of the acrylic amine salt. An aqueous solution of ammonium hydroxide having an ammonium hydroxide concentration in the range of from about 0.03 to about 0.10 weight percent may be used, but other basic aqueous solutions such as an aqueous solution of sodium hydroxide may be used.

During the removal of organic solvent, amine also can be removed. The amount of amine lost will be a function of the boiling point of the amine. Loss of amine may affect the stability of the water dispersion of polymer because as the molecular weight of the polymer increases and/or acid value of the polymer increases, more polymer salt will be required in the aqueous dispersion to maintain the stability thereof. Water removed from the aqueous dispersion and which condenses and separates from the organic solvent contains the amine being removed from the dispersion. To overcome the loss of some of the amine during the distillation or heating to remove the organic solvent, the amine containing water in the distillate is returned back into the dispersion to not only save on the amount of water using in making the dispersion, but also to overcome the loss of the amine from the dispersion. Excess amine is added to the aqueous dispersion, as will be described, in an amount effective to maintain the stability of the dispersion. After removal of the organic solvent, the temperature of the system is lowered. In general, sufficient amine is added such that the pH of the aqueous disper- Any extension of the acrylic polymer should be done in the solvent phase.

Once the acrylic polymer has been extended as required, the polymer is neutralized in the solvent phase with an amine. The temperature of the solution is raised to 85°–87° C. A solution of ammonium hydroxide in water is prepared and added slowly over a period of time such as from about 1 to about 3 hours. As the ammonium hydroxide solution is introduced and heating occurs, the inversion will take place with a resulting increase in viscosity such as from about 50 cps to about 5,000 cps for a polymer having a molecular weight in the range of from about 30,000 to about 300,000 at from about 30 to about 40 weight percent solids. Once this occurs, the remainder of the ammonium hydroxide solution can be added immediately.

Once the solvent has been removed, the temperature of the system is reduced. If the acrylic polymer has a cross-linking functionality, a cross-linking resin such as a melamine or isocyanate can be added to form the polymeric vehicle. Typical solids of the polymeric vehicle are in the range of from about 30 to about 40% solids.

The following examples set forth exemplary methods of making the aqueous acrylic dispersions and polymeric vehicles according to the invention.

(A.) Preparation of the Acrylic Polymer
EXAMPLE I

| Ingredient | Parts |
|---|---|
| A. Xylene | 23.4 |
| B. Methyl n-Amyl Ketone | 15.9 |
| C. Methyl Methacrylate | 7.3 |
| D. Butyl Methacrylate | 1.8 |
| E. Hydroxy ethyl Methacrylate | 9.0 |
| F. Butyl Acrylate | 1.6 |
| G. Methacrylic Acid | 1.6 |
| H. Ethyl 3,3-bis amyl peroxy butyrate | 0.6 |
| I. Ethyl 3,3-bis amyl peroxy butyrate | 0.1 |

Xylene and the methyl n-amyl ketone are charged into a reactor and heated to a reflux temperature of from about 135° C. to about 140° C.

A premix of ingredients C, D, E, F, G and H are added dropwise over 6 hours which reaction mix then is held at 135°–145° C. for about 1 hour. Thereafter, the remaining ethyl 3,3-bis amyl peroxy butyrate (I) is added. After the addition of ingredient I, the reaction temperature is 135°–145° C. and thereafter dropped to about 70° C. The resulting acrylic polymer has a Tg of about 20 ° C.

(B.) Extension of the Acrylic Polymer, Salification of the Extended Polymer and Making the Aqueous Acrylic Polymer Dispersion From an Azeotrope The following ingredients are used to make a water dispersion of an amine salt of the acrylic polymer of Part A.

| Ingredient | Parts |
|---|---|
| J. Methyl pentaethylene diamine | 0.4 |
| K. Tetramethyl Xylene Diisocyanate | 2.9 |
| L. Triethylamine | 2.4 |
| M. Water (Deionized) | 90.0 |
| N. Ammonium Hydroxide (28% Solution) | 1.0 |

Methyl pentaethylene diamine (J) and tetramethyl xylene diisocyanate are added to the reaction product of Part A at 70° C. and held at temperature for about 15 minutes. Thereafter triethylamine (L) is added to the mixture which is held at 70° C. for about 15 minutes after the addition of L. Thereafter the temperature of the reaction mixture is raised to about 90° C. and held at that temperature for about ½ hour to complete the salification reaction. After the salification reaction, a premix of the water (M) and the ammonium hydroxide solution (N) are added dropwise to the reaction mixture over two hours. Thereafter the temperature of the reaction is raised to 90°–95° C. to distill off the organic solvent/water azeotrope and remove the organic solvent. Thereafter the product is cooled to below 50° C. and neutralized with ammonium hydroxide (or triethyl amine). The resulting product has a viscosity of about D (Gardner-Holdt) and about 34.1 weight % non-volatile material.

EXAMPLE II (A.) Preparation or the Acrylic Polymer

An acrylic polymer used in the invention is made with the following monomers and ingredients.

| Ingredient | Parts |
|---|---|
| A. Xylene | 13.2 |
| B. Methyl n-Amyl Ketone | 11.3 |
| C. Styrene | 4.0 |
| D. Methyl Methacrylate | 4.0 |
| E. Butyl Methacrylate | 6.2 |
| F. Butyl Acrylate | 4.3 |
| G. Methacrylic Acid | 2.1 |
| H. Hydroxyethyl Methacrylate | 2.1 |
| I. Ethyl 3,3-bis amyl peroxy butyrate | 0.4 |
| J. Ethyl 3,3-bis amyl peroxy butyrate | 0.1 |

Xylene (A) and methyl n-amyl ketone are charged into a reactor and heated to reflux at a temperature of 135° C. to 140° C. A premixture of ingredients C, D, E, F, G, H and I are added dropwise over 6 hours and held at 135° C. to 145° C. and reflux for about 1 hour. Then 0.1 part ethyl 3,3-bis amyl peroxy butyrate (J) is added and held at 135° C. to 145° C. and reflux for conversion. Thereafter, the temperature of the reaction mixture is dropped to about 70° C. The resulting acrylic polymer has a Tg of about 40° C., is at about 48% solids, has an OH value of about 40 on solids and an AV of about 60 on solids.

(B.) Extension of the Acrylic Polymer, Salification of the Extended Polymer and Making the Aqueous Acrylic Polymer Dispersion From an Azeotrope The following ingredients are used to make a water dispersion of an amine salt of the acrylic polymer of Part A.

| Ingredient | Parts |
|---|---|
| K. Methyl penta ethylene diamine | 0.14 |
| L. Tetramethyl Xylene Diisocyanate | 1.20 |
| M. Triethyl amine | 1.7 |
| N. Water (Deionized) | 103.0 |
| O. Ammonium Hydroxide (28% Solution) | 1.0 |

Methyl penta ethylene diamine (K) and tetramethyl xylene diisocyanate (L) are added to the reaction product of Part A at 70° C. and held at temperature for about 15 minutes. Thereafter triethylamine (M) is added to the mixture which is held at 70° C. for about 15 minutes after the addition of M. Thereafter the temperature of the reaction mixture is raised to about 90° C. and held at that temperature for about 1 hour to complete the salifision is above 7, is preferably between about 7 and about 8.5 and most preferably about 8.5 If an amine is used, the amine used to maintain the neutralization of the amine may be any mono or even polyamine. If the acrylic polymer has a cross-linking functionality and is to be cross-linked, a cross-linking resin is added.

Amines which may be used in the invention include but are not limited to: triethyl amine, tributyl amine, n,n-diethyl aniline and n,n-diethyl methyl amine. Although the formation of the amine salt of an acrylic polymer has been described, water dispersible salts other than amine salts may be used in the invention. The amines used to neutralize the polymer should have a boiling point of at least about 75° C., but not more than about 95° C. to permit the formation of the polymer salt, but also permit the use of an amine system in an air dry polymeric vehicle.

In another important aspect of the invention, the acrylic polymer in the dispersion is substantially completely neutralized with an amine and preferably should have excess amine added effectively giving about 25% to about 50% more amine than required for 100% neutralization of the polymer. This prevents a deficiency of amine and a pH drop in the dispersion caused by the amine loss during distillation and storage. Without excess amine, the pH of the dispersion could drop below 7 and destabilize the dispersion. Such excess amine is also important when water is added to an organic solvent/polymer dispersion for neutralization of the polymer upon addition of the water amine combination.

During the addition of the water or aqueous solution of amine, an "inversion" takes place, that is the water in oil emulsion flips to an oil in water emulsion. While not intending to be bound by any theory, it is believed that as water addition takes place, polymer coated water droplets are inverted to water coated polymer droplets. Although the inversion in this invention is achieved under low shear and 85° to 95° C. temperatures, it can also be accomplished under high shear and 25° to 35° C. temperature or about ambient conditions. During or after the organic solvent is removed from the aqueous dispersion, additional water is added as needed to allow for solvent/water azeotrope removed by the heating or distillation as previously described. The additional water is added to maintain the dispersion and to provide the desired solids level for the aqueous dispersion after the distillation. By way of example, if there is an initial 2:1 solvent to water ratio, for a 40% solids level in the final aqueous dispersion, it is expected that an additional 60 parts water will have to be added.

An important aspect of this invention is a polymeric vehicle which provides a formulated coating composition which has VOCs of 1 pound/gallon of formulated coating composition or lower and permits formulated coating composition having a solids content of about 30 to about 40 weight percent. The latter solids content permits the use of standard or common coating application equipment without readjustment. Moreover, this aspect of the invention also provides new coating binder performances and characteristics previously described. Further, improved humidity resistant films and improved exterior "ultra violet" resistant films are obtainable with a low VOC, 30 to 40% solids water dispersed formulated coating composition which includes the amine salt of the high molecular weight acrylic polymer. The solids content of the formulated coating composition may go up to 45 weight percent with pigments. Acrylic polymers having molecular weights in the range of from about 30,000 to about 300,000 may be used to attain a low VOC formulated coating composition which results in a tough degradation resistant coating binder. The polymeric vehicle and formulated coating composition of the invention reduce or eliminate the need for surfactants and coalescents and are substantially free of them. The polymeric vehicles of the invention may be thermoplastic or may be thermosetting and include cross-linking resins.

In a particularly important aspect of the invention, an acrylic polymer, which could have a lower molecular weight such as below about 12,000 and which would be a precursor acrylic polymer, is subjected to an extension reaction with a polyol such as a diol or triol with a diisocyanate. As a result, where the extension reaction is with a diisocyanate, the acrylic polymer not only needs a carboxyl functionality to neutralize, but also requires a functionality reactive with isocyanate such as an active hydrogen, hydroxyl or oxirane. In addition to the diisocyanate extension reaction with the low molecular weight acrylic, additional extension can take place if a polyol such as a diol, triol or an amine, diamine or triamine, primary or secondary are added to the acrylic/diisocyanate reaction as co-reactants. The extension reaction provides an extended acrylic polymer having a molecular weight in the range of from about 30,000 to about 300,000 and an acid value of from about 15 to about 100. Diisocyanates and biurets may be used in the extension reaction. Diisocyanates which are particularly important in this aspect of the invention include hexamethylene diisocyanate (HMDI), hexyl diisocyanate (HDI), isophrone diisocyanate (IPDI), tetramethylxylene diisocyanate (TMXDI), toluene diisocyanate (TDI) and hydrogenated methylene diphenyl diisocyanate ($H_{12}$MDI). Polyols which may be used in the invention, but are not limited to, include: trimethyol propane, diethylene glycol, propylene glycol, polyethylene glycols or poly caprolactone polyols. Amines which may be used in the invention, but are not limited to, include: ethyl pentaethylene diamine, menthane diamine polyoxypropylene poly amines, triethanol amine or (1,4-Bis (3-aminopropyl) piperazine).

Where the acrylic polymer is extended with a diisocyanate to provide an isocyanate extended urethane linkage, the polyamine may neutralize the acrylic polymer, but also increase the pH of the mixture of the amine and acrylic polymer in the organic solvent which will drive the isocyanate extension reaction to completion. Thereafter, amine or aqueous ammonium hydroxide is slowly mixed with the mixture of the amine salt of the chain extended acrylic polymer.

The chain extended polymer/organic solvent combination is neutralized as previously described in connection with acrylics which are not extended with an amine having a boiling point of from about 75° C., but not greater than about 150° C. Once the organic solvent has been removed, as previously described, the temperature of the system is reduced. If the acrylic polymer has a cross-linking functionality, a cross-linking resin such as a melamine or isocyanate can be added to form the polymeric vehicle. Typical solids of the polymeric vehicle are in the range of from about 30 to about 40% solids.

To make the polymeric vehicle of the invention, the acrylic polymer is solvated in an organic solvent to provide a solution prior to dispersion in water. To develop ultimate film performance, the molecular weight of the acrylic polymer should be as great as possible.

cation reaction. After the salification reaction, the temperature of the reaction mixture is dropped to 85° C. to 88° C. and a premix of water (N) and ammonium hydroxide solution (O) are added dropwise to the reaction mixture over 2 to 3 hours. Thereafter the temperature of the reaction is raised to 90°-95° C. to distill off the organic solvent/water azeotrope and remove the organic solvent. Thereafter the product is cooled to below 50° C. and neutralized with ammonium hydroxide (or triethyl amine). The resulting product has a viscosity of about E (Gardner-Holdt) and about 23.5 weight % non-volatile material.

EXAMPLE III (A.) Preparation of the Acrylic Polymer

| Ingredient | Parts |
|---|---|
| A. Xylene | 33.1 |
| B. Methyl n-Amyl Ketone | 16.0 |
| C. Methyl Methacrylate | 8.7 |
| D. Butyl Methacrylate | 0.6 |
| E. Hydroxy ethyl Methacrylate | 1.9 |
| F. Lauryl Methacrylate | 3.5 |
| G. Methacrylic Acid | 5.4 |
| H. Styrene | 21.8 |
| I. t-Butyl Peroxyacetate | 9.0 |

Xylene and the methyl n-amyl ketone are charged into a reactor and heated to a reflux temperature of from about 135° C. to about 140° C.

A premix of ingredients C, D, E, F, G, H and about 80% of I are added dropwise over 4 hours which reaction mix then is held at 135°-145° C. at reflux for about 1 hour. Thereafter, the remaining I (tert-butyl peroxyacetate) is added over three hours. After the addition of ingredient I, the reaction temperature is about 138° C. and thereafter dropped to about 70° C. The resulting acrylic polymer has a Tg of about 20° C. The above acrylic polymer may be salified and dispersed as described in the previous examples.

EXAMPLE IV (A.) Preparation of the Acrylic and Chlorinated Olefin Copolymer

| Ingredient | Parts |
|---|---|
| A. Xylene | 17.10 |
| B. Methyl n-Amyl Ketone | 8.55 |
| C. Styrene | 2.38 |
| D. Methyl Methacrylate | 5.80 |
| E. Lauryl Methacrylate | 17.32 |
| F. Methacrylic Acid | 3.07 |
| G. Hardlin 14 LLB (Chlorinated Polyolefin)* | 10.00 |
| H. Hydroxyethyl Acrylate | 1.67 |
| I. t-Butyl Peroctoate | 0.65 |
| J. t-Butyl Peroctoate | 0.06 |
| | 66.60 |

*This is a polyolefin sold by Tayo Kasei Kogo Co which has 27 ± 1 weight percent chlorine based upon the weight of the resin and which has a molecular weight of about 45,000.

Xylene and the methyl n-amyl ketone are charged into a reactor and heated to a temperature of from about 90° C. to about 95° C.

A premix of ingredients C, D, E, F, G, H and I are added dropwise over two hours which reaction mix then is held at 90°-95° C. for about one hour. Thereafter, the remaining t-butyl peroctoate (J) is added. After the addition of ingredient J, the reaction temperature is 90°-95° C. and thereafter dropped to about 70° C. The resulting acrylic polymer has a Tg of about 10° C.

(B.) Extension of the Acrylic Polymer, Amine Salification of the Polymer and Making of the Aqueous Acrylic Polymer Dispersion From an Azeotrope The following ingredients are used to make a water dispersion of an amine salt of the acrylic polymer of Part IV (A).

| Ingredient | Parts |
|---|---|
| J. Methyl pentaethylene diamine | 0.4 |
| K. Tetramethyl Xylene Diisocyanate | 2.9 |
| L. Triethylamine | 2.4 |
| M. Water (Deionized) | 90.0 |
| N. Amonia Hydroxide (28% Solution) | 1.0 |

Methyl pentaethylene diamine (J) and tetramethyl xylene diisocyanate (K) are added to the reaction product of Part A at 70° C. and held at temperature for about 15 minutes. Thereafter triethylamine (L) is added to the mixture which is held at 70° C. for about 15 minutes after the addition of L. The addition of triethylamine salifies the carboxyl groups on the polymer. Thereafter the temperature of the reaction mixture is raised to about 90° C. and held at that temperature for about ½ hour to complete the reaction of the diisocyanate and the diamine and hydroxyls of the polymer, resulting in an extended polymer salt. The resulting extended polymer salt in solvent is now ready for dispersion in water.

Water (M) and ammonia hydroxide (N) are charged in to a reaction vessel of the extended polymer amine salt/solvent from above. Thereafter, the azeotrope of water and xylene/methyl n-amyl ketone/and toluene (from the Hardlin polyolefin) is distilled from the water/salt/organic solvent mixture. A dispersion results as described in the prior examples.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A process for making a water dispersion of a water dispersible amine salt of an acrylic polymer, the amine salt of the acrylic polymer being a reaction product of a mixture comprising the acrylic polymer having carboxyl groups, an amine and a substantially water immiscible organic solvent in a neutralization reaction, the acrylic polymer having a weight average molecular weight in the range of from about 30,000 to about 300,000 and an acid value in the range of about 15 to about 100, the process comprising:

adding water to a dispersion of the acrylic polymer or the amine salt of the acrylic polymer in the substantially water immiscible organic solvent, to form an acrylic polymer amine salt/organic solvent/water mixture, the substantially water immiscible organic solvent and water being in amounts effective for forming an azeotrope having a boiling point in the range of from about 85° C. to about 95° C.;

inverting the mixture and forming an organic solvent in water azeotrope;

heating the azeotrope to remove the substantially water immiscible organic solvent;

condensing the water and substantially water immiscible organic solvent being removed from the water dispersion;

separating the substantially water immiscible organic solvent and water, the water dispersion being formed and the organic solvent being removed by the heating of the azeotrope to form the water dispersion of the water dispersible amine salt of the acrylic polymer, the organic solvent capable of being separated from the water after the heating for circulation of the water to the mixture by virtue of the immiscibility of the organic solvent with the water, and circulating the water separated from the organic solvent back into the mixture to provide an aqueous dispersion of the amine salt of the acrylic polymer, at least 60% of the carboxyl groups of the acrylic polymer being neutralized and the dispersion having at least about 30 weight percent acrylic polymer and salt thereof as solids, less than 2 weight percent of organic solvent and being substantially free of an emulsifier.

2. A process as recited in claim 1 wherein the acrylic polymer has an acid value in the range of from about 15 to about 75.

3. A process as recited in claim 1 wherein the organic solvent has a boiling point of at least about 100° C.

4. A process as recited in claim 1 wherein the dispersion has a solid level of from about 30 to about 40 weight percent.

5. A process as recited in claim 1 wherein the water is added to the acrylic polymer and the water includes an amine.

6. A process as recited in claim 1 wherein the acrylic polymer is the reaction product of an extension reaction of a precursor acrylic polymer and diisocyanate.

7. A process as recited in claim 1 wherein the acrylic polymer comprises from about 5 to about 20 weight percent chlorinated polyolefin.

* * * * *